(12) United States Patent
Delaney

(10) Patent No.: US 8,820,159 B2
(45) Date of Patent: Sep. 2, 2014

(54) MEASURING DEVICE

(75) Inventor: Martina Delaney, Dublin (IE)

(73) Assignee: Handy Baby Products Limited, Dublin (IE)

( * ) Notice: Subject to any disclaimer, the term of this patent is extended or adjusted under 35 U.S.C. 154(b) by 143 days.

(21) Appl. No.: 13/377,644

(22) PCT Filed: Jun. 23, 2010

(86) PCT No.: PCT/EP2010/058891
§ 371 (c)(1),
(2), (4) Date: Feb. 9, 2012

(87) PCT Pub. No.: WO2011/000750
PCT Pub. Date: Jan. 6, 2011

(65) Prior Publication Data
US 2012/0167679 A1   Jul. 5, 2012

(30) Foreign Application Priority Data

Jul. 2, 2009  (IE) .................................. S2009/0508
Oct. 12, 2009 (IE) .................................. S2009/0788

(51) Int. Cl.
*G01F 19/00* (2006.01)

(52) U.S. Cl.
USPC ........................................................... 73/429

(58) Field of Classification Search
USPC ............................................................ 73/429
See application file for complete search history.

(56) References Cited

U.S. PATENT DOCUMENTS

| 2,230,479 A | | 2/1941 | Becher | |
|---|---|---|---|---|
| 4,116,071 A | * | 9/1978 | Sakura | 73/429 |
| 6,026,685 A | * | 2/2000 | Weterrings et al. | 73/429 |
| 2009/0056440 A1 | * | 3/2009 | Vendl et al. | 73/429 |
| 2009/0302068 A1 | * | 12/2009 | Schneider | 222/344 |
| 2012/0248138 A1 | * | 10/2012 | Wollach | 222/1 |

FOREIGN PATENT DOCUMENTS

| WO | 97/14937 | | 4/1997 | |
|---|---|---|---|---|
| WO | WO 9714937 A1 | * | 4/1997 | G01F 19/00 |
| WO | 2004/042331 | | 5/2004 | |

* cited by examiner

*Primary Examiner* — Lisa Caputo
*Assistant Examiner* — Jamel Williams
(74) *Attorney, Agent, or Firm* — Fay Kaplun & Marcin, LLP

(57) ABSTRACT

An adjustable measuring device is for use in measuring out various amounts of granular or powdered material such as infant formula powder or the like.

10 Claims, 6 Drawing Sheets

MEASURING DEVICE

FIELD OF THE INVENTION

This invention relates to a measuring device, in particular an adjustable measuring device.

BACKGROUND OF THE INVENTION

In the area of infant feeding, it is often required to measure out exact amounts of infant formula powder to be added to water during the preparation of the formula. This is generally done using scoops of pre-defined volume to arrive at the desired quantity of formula. However, the measuring out of formula in such a manner can be relatively complicated, and result in unwanted mess.

PCT Patent Application Publication No. 2005/073678 describes an adjustable measuring scoop, wherein a moveable wall is provided in a scoop, the moveable wall forming part of a variable volume chamber. The moveable wall is adjusted by actuating a slider provided on the handle of the scoop. However, such a device relies on a tight seal being provided between the moveable wall and the remainder of the chamber. If any damage is inflicted on the sliding mechanism, or on the seal between the moveable wall and the chamber, the device is consequently of a reduced effectiveness.

SUMMARY OF THE INVENTION

The present invention relates to a measuring device which allows for adjustable operation, and which is of increased reliability.

According to the invention there is provided a measuring device comprising an open-topped receptacle comprising a base and a height-adjustable sidewall to provide a variable capacity, the sidewall comprising a height-adjustable collar mounted on the base, wherein the collar is mountable in any selected one of a plurality of angular positions relative to the base, each angular position corresponding to a different height of the collar on the base.

Preferably the base comprises a bowl having a peripheral wall, and wherein the collar is mounted on the peripheral wall so that the collar and peripheral wall overlap to form the sidewall of the receptacle.

The base and collar may have cooperating stop means which stop the collar and base from overlapping beyond a certain point according to the angular position of the collar.

The stop means may comprise a plurality of angularly spaced projections or channels on one of the base and collar, and at least one mating channel or projection respectively on the other of the base and collar, the mating channel or projection being able to slidably engage any selected one of the angularly spaced projections or channels by sliding the collar onto the base, the angularly spaced projections or channels having different lengths to define different degrees of overlap between the collar and the base.

Preferably, said collar is adapted to form a seal about said peripheral wall when said collar is mounted to said base.

In one embodiment, said angularly spaced projections are formed on said collar, wherein said angularly spaced projections comprise sections of reduced thickness relative to adjacent sections of said collar.

Preferably, said channel is dimensioned to receive said reduced thickness section such that said sections of the walls of the collar portion adjacent said reduced thickness section abut a shoulder formed on said base portion adjacent said channel.

Preferably, said angularly spaced projections are substantially parallel to one another.

In a further embodiment, said angularly spaced channels are formed on said peripheral wall of said base, wherein at least one raised projection is formed on said collar, and wherein said angularly spaced channels are arranged to selectively receive said at least one raised projection.

Preferably, at least one coupling projection is formed on at least one of said plurality of angularly spaced projections or channels, wherein at least one coupling notch is defined on at least one of said mating channels or projections, wherein said coupling projection is operable to releasably couple with said coupling notch to secure said base to said collar.

Preferably, the edges of the base portion or the collar are rolled edges.

This allows the measuring device to be more easily passed through particulate matter for collection and measuring of said particulate matter.

Preferably, the measuring device comprises at least one vent to allow gases to exit said measuring device during filling of said measuring device.

This ensures that no air pockets are created between the formula and the walls of the measuring device, which would prevent the measuring device from filling to capacity.

Preferably, said at least one vent is dimensioned to prevent particulate matter from passing through the vent.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
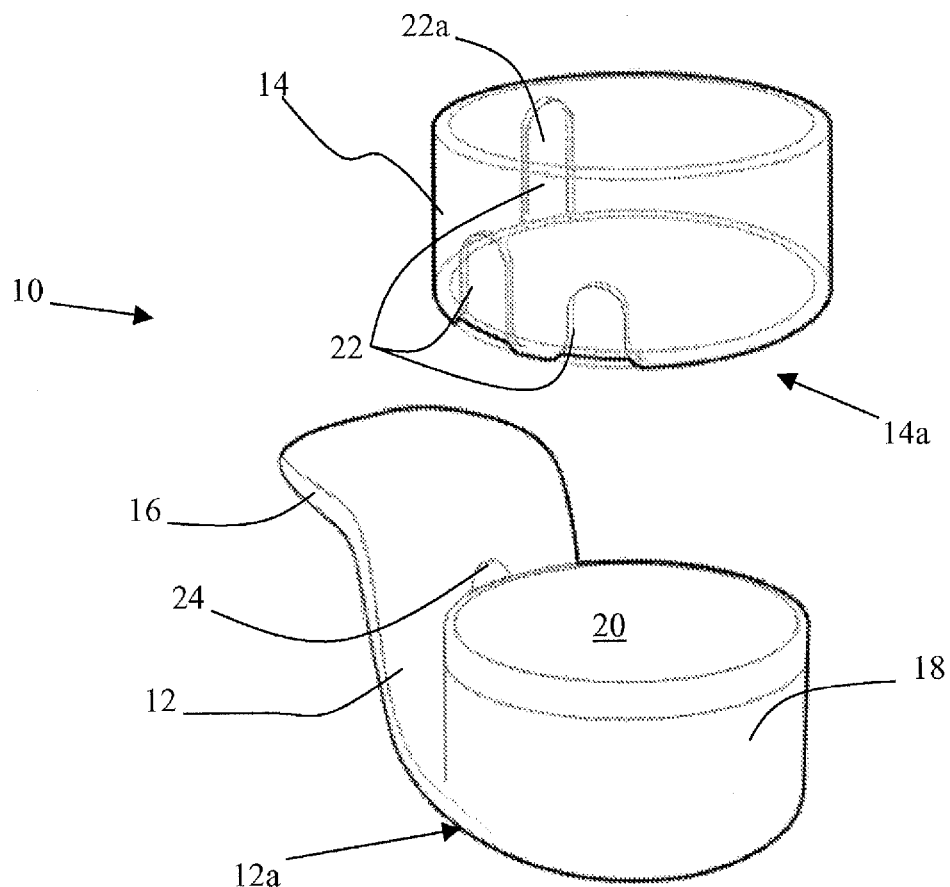
FIG. 1 is a perspective exploded view of an embodiment of measuring device of the invention in the form of an adjustable measuring scoop.
Figure 2:
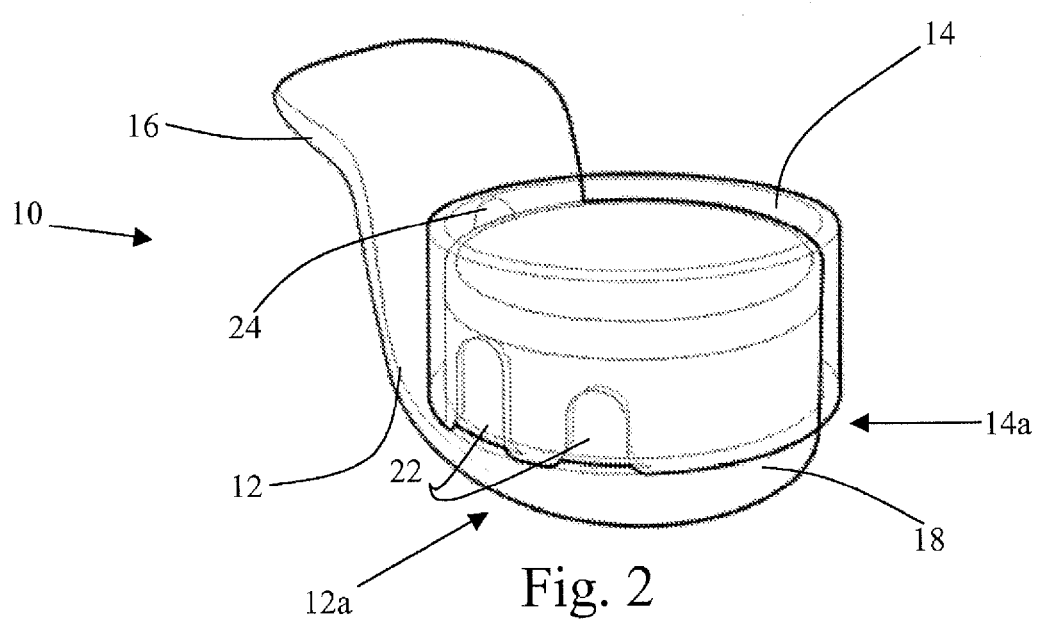
FIG. 2 is a perspective view of the scoop of FIG. 1 when assembled.
Figure 3:
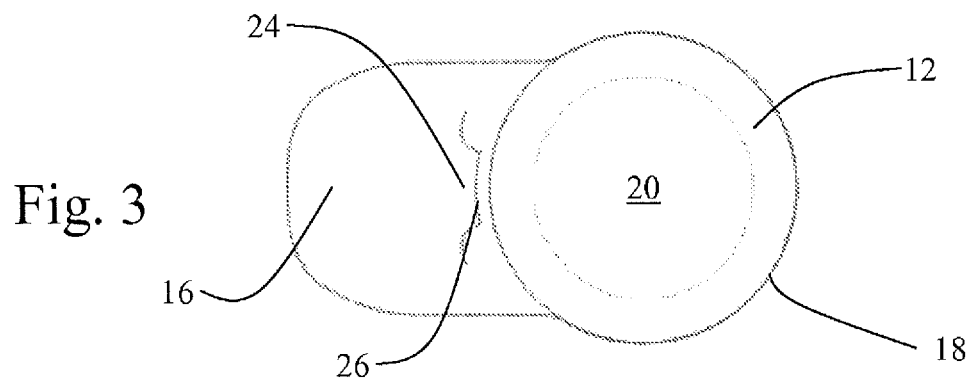
FIG. 3 is a top plan view of the base portion of the scoop of FIG. 1.
Figure 4:
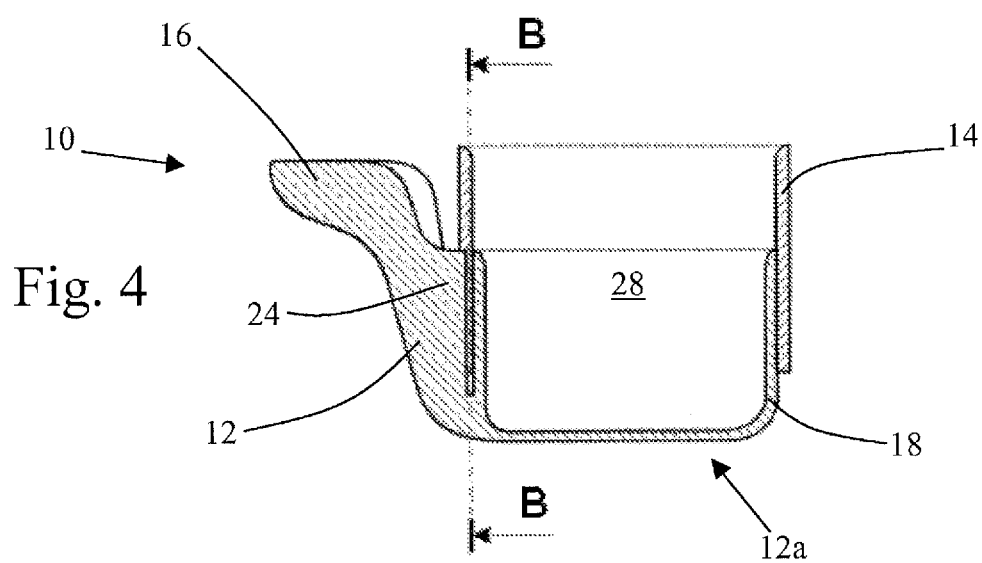
FIG. 4 is a cross-sectional view of the assembled scoop of FIG. 2.
Figure 5:
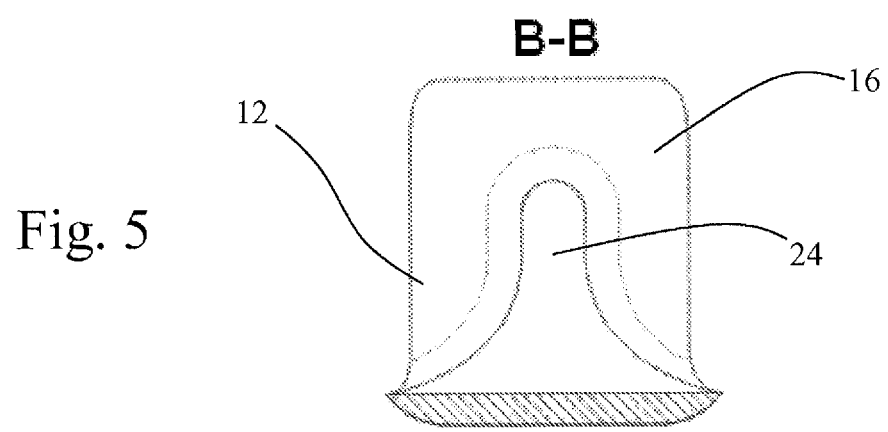
FIG. 5 is a cross-sectional view of the base portion of the scoop of FIG. 4 along the line B-B.
Figure 6:
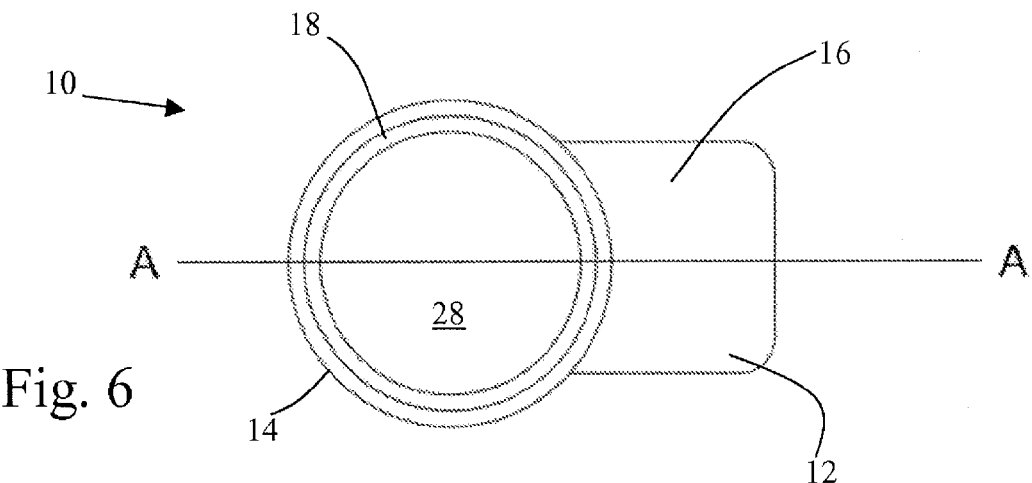
FIG. 6 is a top plan view of the assembled scoop of FIG. 2.

With reference to FIGS. 1 and 2, a measurement scoop 10 comprises a base portion 12 and a collar portion 14. The base portion 12 comprises a bowl 20 having a cylindrical peripheral wall 18 and a handle 16 extending from the lower end 12a of the bowl 20, the handle 16 having a generally inverted L-shaped configuration.

The collar portion 14 comprises a substantially hollow cylinder. As can be seen from FIG. 1, a plurality of mating sections in the form of shallow channels 22 are defined at different angular positions around the exterior surface of the collar 14. The channels 22 comprise portions of the wall 18 of reduced thickness, and extend upwardly in parallel from the lower edge 14a of the collar 14. The channels 22 extend to different heights of the collar, i.e., they have different lengths.

Turning now to FIGS. 3-6, a flat shallow ridge 24 extends upwardly on the surface of the handle 16 facing the wall 18 to define a narrow gap 26 between the ridge 24 and the wall 18. The width of the gap 26 is substantially the same as the reduced thickness of the wall 18 in each of the channels 22. Further, the lateral width of the parallel-sided upper end of the ridge 24, and the height of the ridge 24 (i.e. the amount by which the ridge is raised above the surrounding handle surface), are substantially the same as the lateral width and depth respectively of each channel 22.

Figure 7A:
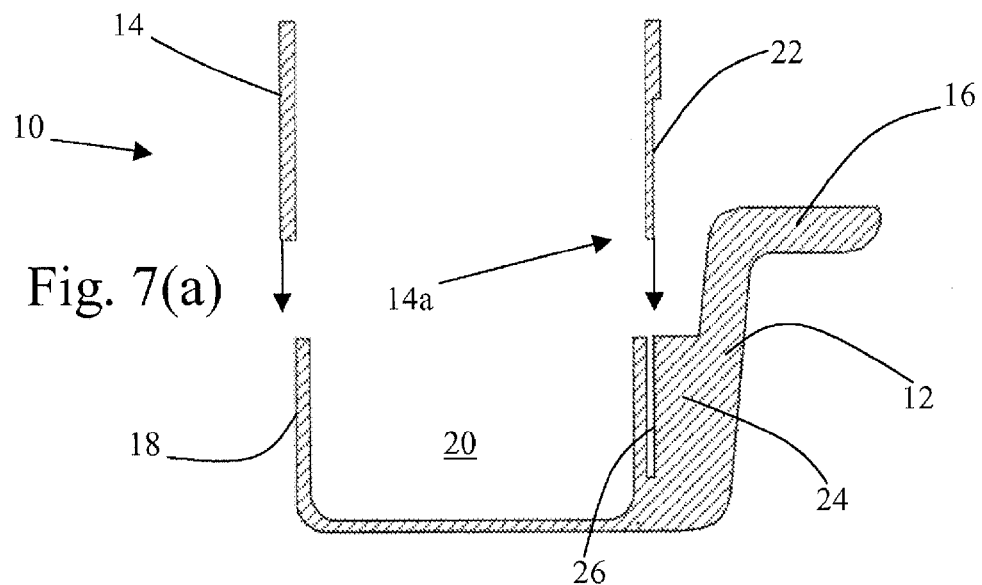
FIG. 7 shows a cross-sectional view of the assembly of the scoop of FIG. 6 along the line A-A.
Figure 7B:
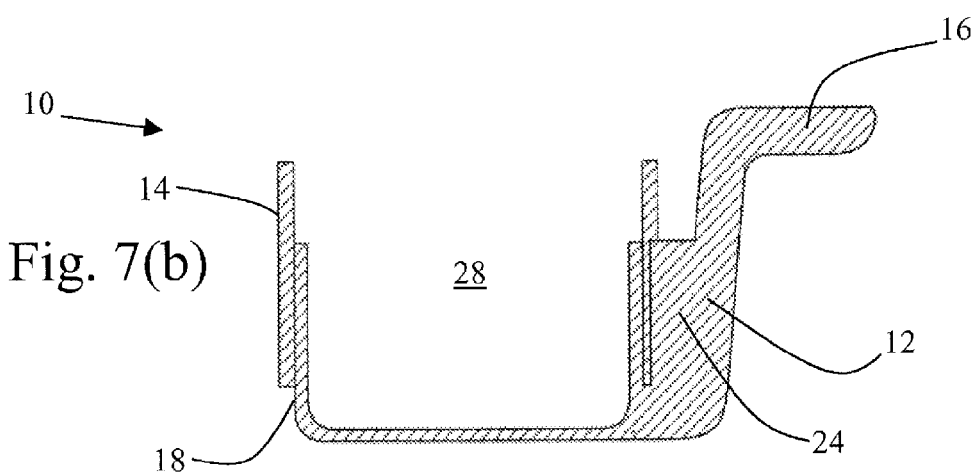

The components are dimensioned such that the collar 14 can be slid concentrically onto the wall 18, in the direction of the arrows in FIG. 7(a), at any angular position relative to the bowl 20 where a selected one of the channels 22 is aligned with the ridge 24, so that the ridge 24 can slide into the selected channel 22. The collar 14 can be slid down over the wall 18 only so far as the selected channel 22 allows, i.e. until the top end of the ridge 24 abuts the closed end of the channel 22, FIG. 7(b). Since the channels 22 are of different lengths a different degree of overlap between the collar and bowl 20 is obtained according to which of the channels 22 is selected. The engagement of the collar and bowl is a snug push-fit so that they do not become inadvertently loose.

Once the base portion 12 and the collar 14 are coupled together as described, an open-topped receptacle 28 is formed whose sidewall comprises the circular wall 18 of the base portion 12 and the non-overlapping section of the circular collar 14 projecting above it, the receptacle 28 having a greater internal volume or capacity than the bowl 20 alone. As described, the capacity of the receptacle 28 can be varied by selecting which of the different length channels 22 engage the ridge 24.

Since the cross-sections of the channels 22 and the ridge 24 are complementary, a secure coupling is provided between the base portion 12 and the collar 14, and rotation of the collar 14 relative to the base portion 12 is prevented.

It will be understood that the profile of the various sections of the scoop 10, e.g. the ridge 24, the channel 26, may be shaped to provide no overhangs and to allow relatively easy cleaning of the scoop, so as to provide no catchment areas for formula and/or bacteria to collect in the scoop.

While the channels 22 shown in the embodiment are parallel to one another and extend orthogonally to the lower end 14a of the collar 14, they may be provided in any suitable configuration which allows the collar 14 to project at different heights above the surface of the base portion 12, thereby allowing the capacity of the receptacle 28 to be varied. For example, the channels 22 may extend at an acute angle to the lower end 14a of the collar 14, forming a "twist-fit" coupling. In that case the ridge 24 would be replaced by a shallow circular stud having a diameter the same as the width of the channels.

It will be further understood that the scoop 10 may be designed such that a single channel 22 is provided on the base portion 12, and a plurality of downwardly extending ridges 24 of different length are provided at different angular positions on the collar 14.

Embodiments are also possible in which the collar 14 fits inside the bowl 20, i.e. it overlaps the wall 18 internally. It is also possible to have a non-circular collar 14 and wall 18. For example, they may both be square, so that the collar may be orientated at four different angular positions on the bowl, each providing a different capacity. Other regular polygonal shapes may be used.

Figure 8:
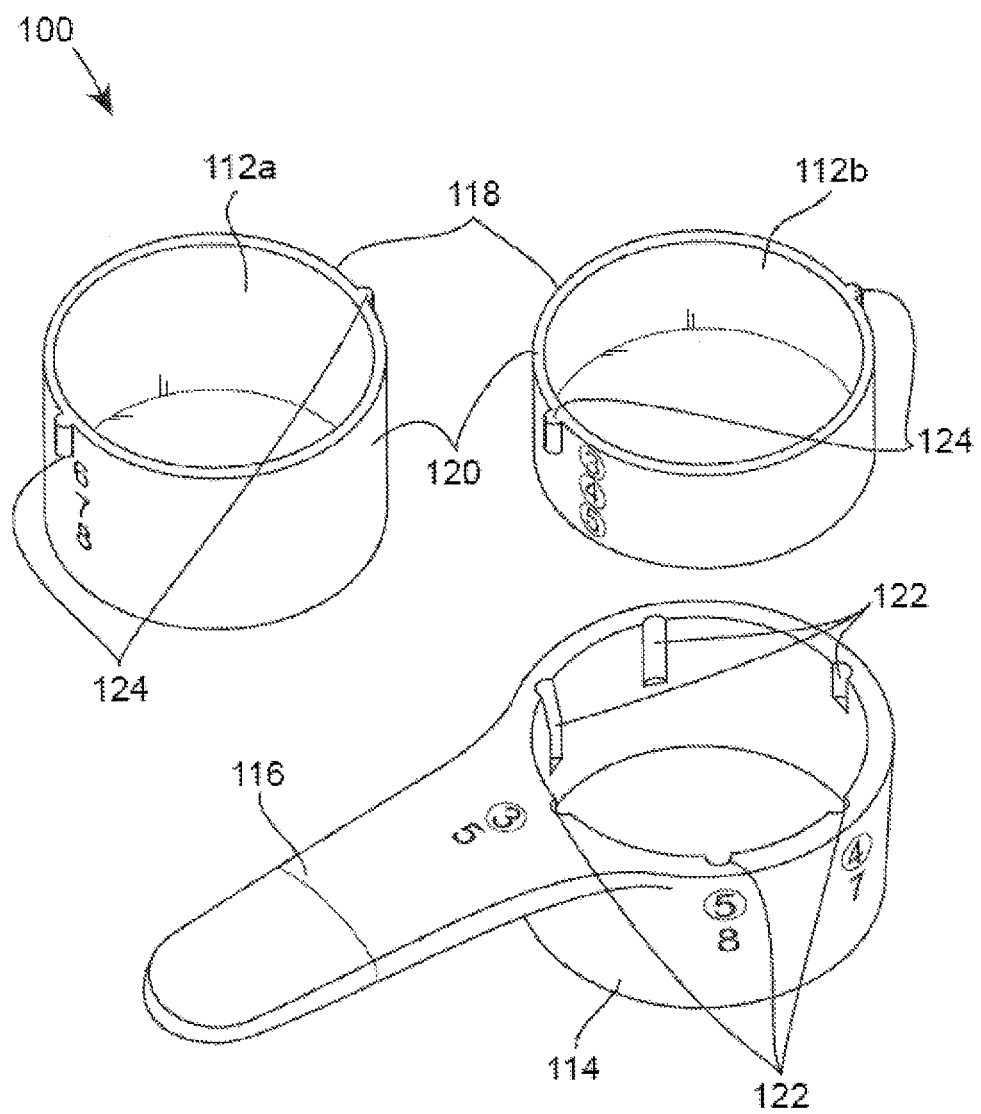
FIG. 8 shows a further embodiment of measuring device of the invention in the form of an adjustable measuring scoop.

A further embodiment of measuring device in the form of a scoop is illustrated in FIG. 8, indicated at 100. In this embodiment, collar portion 114 is provided with a handle portion 116 projecting therefrom. An even number of channels 122 are formed on the internal surface of the collar portion 114, the channels 122 extending from the upper surface of the collar portion 114 along a length of the collar portion 114. The channels 122 are evenly spaced about the diameter of the collar portion 114. The channels 122 are arranged such that a pair of opposed channels 122 extend to the same length along the internal wall of the collar portion 113, with each pair of opposed channels 122 extending to different lengths along the internal wall of the collar portion 114.

A plurality of base portions 112a,112b are further provided, the base portions 112a,112b comprising a bowl 120 having a cylindrical peripheral wall 118. A pair of projections 124 are provided on the external surface of the peripheral wall 118 of the bowl 120, the projections 124 provided at diametrically opposite sides of the bowl 120. As can be seen from FIG. 8, the base portions 112a,112b are arranged such that the peripheral wall 118 of the first base portion 112a has a greater height than the peripheral wall 118 of the second base portion 112b. The base portions 112a,112b are dimensioned such that the bowl 120 will fit within the collar portion 114.

In use, the base portion 112a,112b is slid into the collar portion 114, such that the respective projections 124 are received within a pair of opposed channels 122. As the pairs of channels 122 are of different heights, by selecting the appropriate pair of channels 122 to insert the projections 124 into, the overlap between the bowl 120 and the collar portion 114 can be adjusted, and therefore the volume of the receptacle formed by the bowl 120 and the collar portion 114 can be varied.

Furthermore, as the base portions 112a,112b differ in height, a wider variety of volumes can be obtained—use of the relatively taller first base portion 112a results in a larger volume, while use of the relatively shorter second base portion 112b results in a smaller volume. For example, if, as shown in FIG. 8, 3 pairs of opposed channels 122 are provided in collar portion 114, then six possible volume sizes may be obtained through use of the device 100, through the use of the first and second base portions 112a,112b in each respective pair of opposed channels 122.

Figure 9:
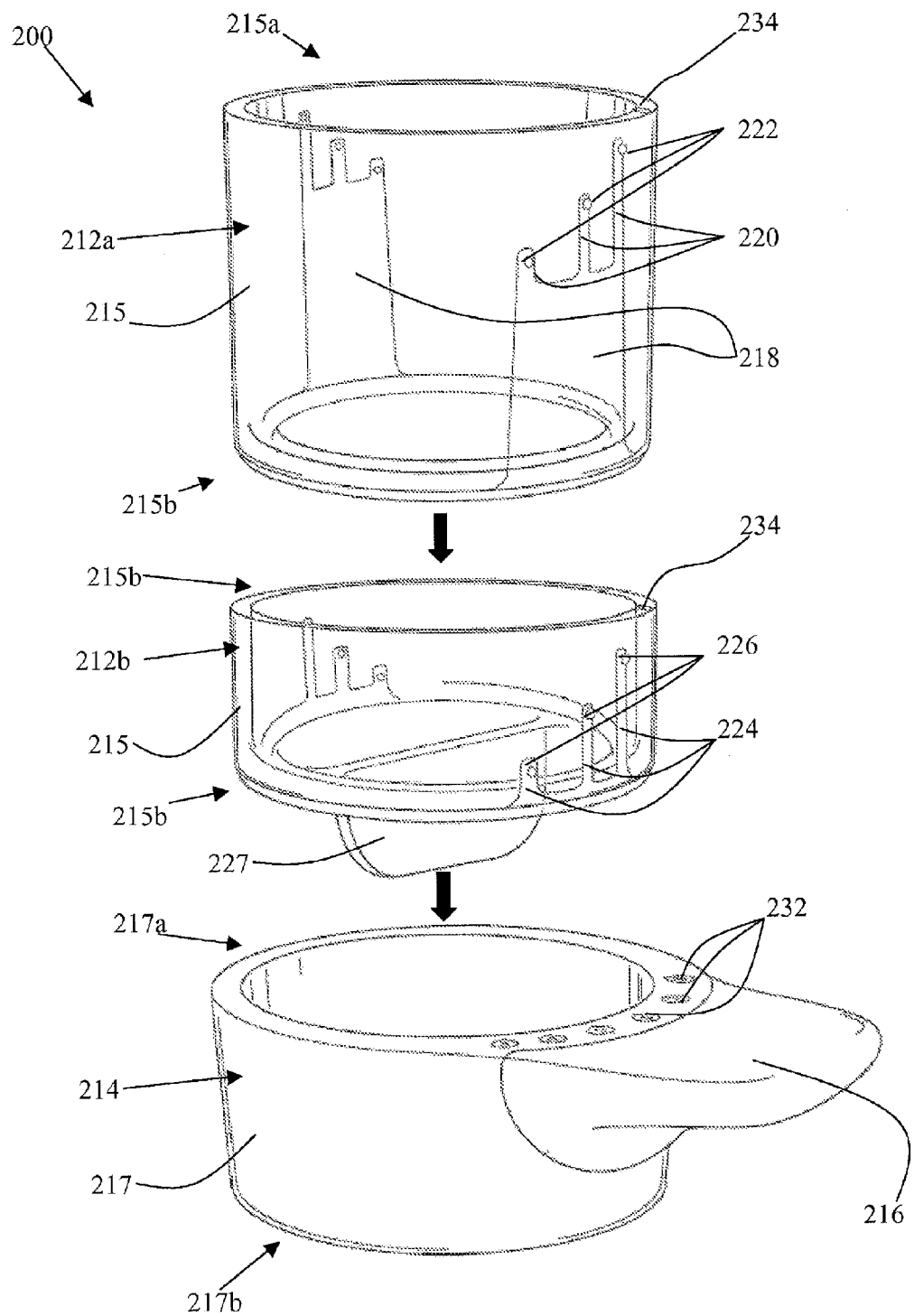
FIG. 9 is an exploded view of a further embodiment of a measuring device according to the invention.
Figure 10:
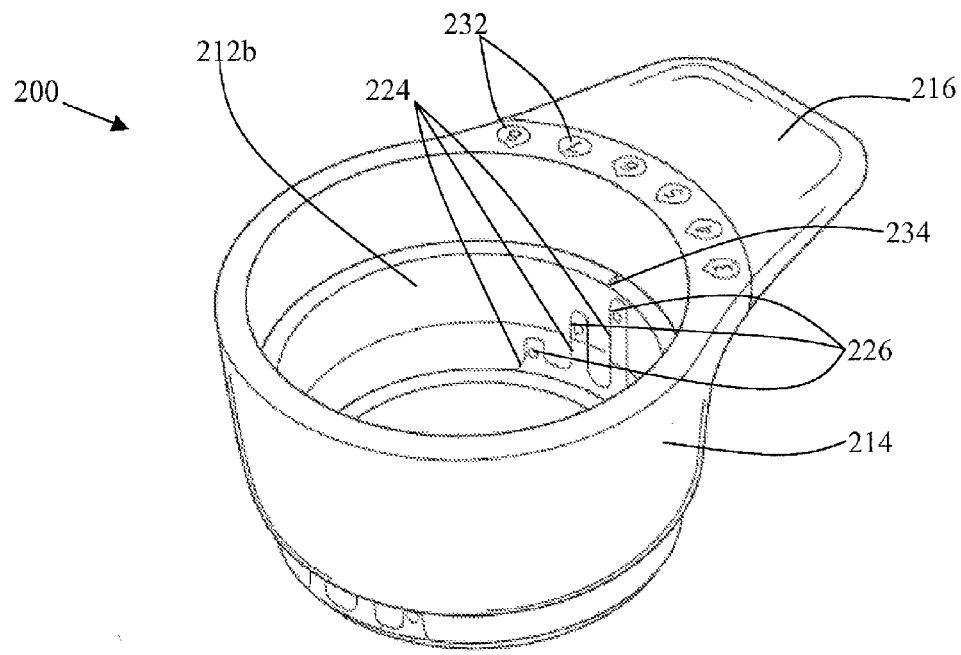
FIG. 10 is a perspective view of the assembled measuring device of FIG. 9.
Figure 11:
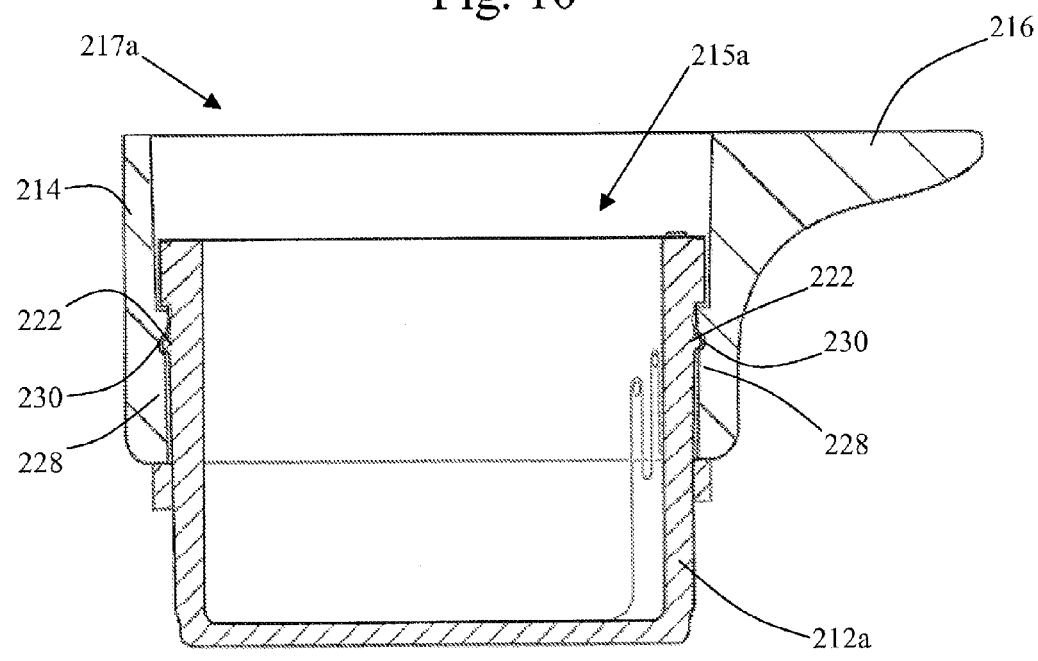
FIG. 11 is a cross-sectional view of the device of FIG. 10.

A further embodiment of the invention is illustrated in FIGS. 9-11, indicated at 200. The measuring device 200 comprises a collar portion 214 and a pair of base portions 212a,212b. The first and second base portions 212a,212b both comprise an open-topped substantially cylindrical receptacle body 215, having an open end 215a and a closed end 215b, the first base portion 212a being taller in height relative to the second base portion 212b. The collar portion 214 comprises a circular collar body 217 having an upper end 217a and a lower end 217b. Both the first and second base portions 212a,212b are dimensioned to be snugly received within the circular collar body 217 of the collar portion 214.

A pair of relatively wide channels 218 are defined on the external surface of the receptacle body 215 of the first base portion 212a, said channels 218 shallow relative to the thickness of the adjacent walls of the receptacle body 215. The channels 218 extend from the closed end 215b along a portion of the receptacle body 215. Said channels 218 are provided on diametrically opposed sides of the first base portion 212a, and extend in a direction orthogonal to the plane of said closed end 215b.

A plurality of spaced, parallel finger indentations 220 are defined on the external surface of said receptacle body 215. The finger indentations 220 are arranged such that a series of indentations of staggered heights are provided extending from the upper end of each channel 218 towards the open end 215a of the receptacle body 215, each indentation 220 diametrically opposed an indentation 220 of identical height extending from the upper end of the opposed channel 218. A raised dimple projection 222 is defined at the distal end of each of said finger indentations 220.

A plurality of spaced, parallel finger indentations 224 are similarly defined on the external surface of the receptacle body of the relatively smaller second base portion 212b, having raised dimple projections 226 defined at the distal ends of the finger indentations 224. As the second base portion 212b is smaller than the first base portion 212a, the finger indentations 224 extend from the closed end 215b of the receptacle body 215 towards the open end 215a (i.e. a shallow channel similar to channel 218 is not defined in the second base portion 212b).

As can be seen from FIG. 9, a tab 227 projects from the underside of said second base portion 212b from the closed end 215b of the receptacle body 215. Tab 227 aids handling and manipulation of said second base portion 212b.

A handle portion 216 projects from a side of said collar portion 214. Two diametrically opposed finger projections (indicated at 228 in FIG. 11) are provided on the internal surface of the circular collar body 217 of the collar portion 214. The finger projections 228 extend from the lower end 217b along the internal surface toward the upper end 217a of the collar body 217. The finger projections 228 are dimensioned to be received within the finger indentations 220,224 of the base portions 212a,212b. A dimple recess (230, FIG. 11) is defined at the distal end of both finger projections 228.

In use, dependent on the amount of particulate matter it is desired to measure out, either the first or second base portion 212a,212b is inserted into the collar portion 214 in a downward direction (indicated by the arrows in FIG. 9).

Due to the snug fit between the collar portion 214 and the receptacle body 215 of both the first or second base portion 212a,212b, the first base portion 212a can only be inserted into the collar portion 214 such that the respective finger projections 228 are initially received within the respective opposed channels 218. The first base portion 212a can then be rotated relative to the collar portion 214 and the first base portion 212a, such that the finger projections 228 are orientated with one of the opposed pairs of finger indentations 220.

The first base portion 212a can then be further advanced through the collar portion 214, with the finger projections 228 received within a corresponding opposed pair of finger indentations 220. The base portion 212a is advanced until the finger projections 228 abut the upper end of the finger indentations 220, preventing further advancement of the base portion 212a through the collar portion 214.

With regard to the second base portion 212b, the process is repeated, except that the finger projections 228 of the collar portion 214 are aligned with the finger indentations 224 of the second base portion 212b prior to insertion (as the second base portion 212b does not comprise a channel 218).

It will be understood that any of the components of the measuring device may be made from a relatively deformable material, such that the raised dimple projections 222,226 can snap-fit into the dimple recesses 230, providing for a releasable securing of the base portion 212a,212b to the collar portion 214.

As the finger indentations 220,224 are of different heights, this allows for the advancement of the base portions 212a, 212b to different depths relative to the collar portion 214. Accordingly, the volume of receptacle created by the walls of the base portion 212a,212b and the walls of the collar portion 214 can be varied based on the selection of base portion 212a,212b to be used, and the particular pair of opposed finger indentations 220,224 selected to receive the finger projections 228.

It will be understood that a series of surface indications 232 may be provided on the collar portion 214, with a graphical indication or a raised indication 234 provided on the first and second base portions 212a,212b. Such indications 232,234 are arranged such that, dependent on the selection of base portion 212a,212b and finger indentations 220,224 used, a graphical marker is provided as to the currently-configured volume of the measuring device.

With reference to FIGS. 9 and 10, the surface indications 232 signal the volume of the measuring device in the form of the number of scoops of formula it is equivalent to, with the raised indication 234 being aligned with a particular number of scoops dependent on the base portion 212a,212b used and the angular rotation of the base portion relative to the collar portion 214 (i.e. the pair of opposed finger indentations 220, 224 used).

It will be understood that in any of the above embodiments, the edges of the base portion and/or the collar portion may be rolled or rounded, such that the measuring device can be more easily passed through particulate matter for collection and measuring of said particulate matter.

It will be understood that any of the above embodiments may further comprise at least one vent, preferably provided in the base portion. The use of a vent will ensure that, when formula or other particulate matter is being collected in the measuring device, air is released through the vent. This ensures that no air pockets are created between the formula and the walls of the measuring device, which would prevent the measuring device from filling to capacity. It will further be understood that such vent(s) may be dimensioned to prevent formula or particulate matter from passing through the vent (s).

In all cases, the design of the embodiments as a two-part or three-part device allows for relatively easy assembly and cleaning, while providing less moving parts, leading to increased simplicity of use.

The invention claimed is:

1. A measuring device comprising:
an open-topped receptacle comprising a base and a height-adjustable sidewall to provide a variable capacity, the sidewall comprising a height-adjustable collar mounted on the base,
wherein the collar is mountable in any selected one of a plurality of angular positions relative to the base, each angular position corresponding to a different height of the collar on the base, the base comprising a bowl having a peripheral wall, and wherein the collar is mounted on the peripheral wall so that the collar and peripheral wall overlap to form the sidewall of the receptacle, the base and collar having cooperating stop means which stop the collar and base from overlapping beyond a certain point according to the angular position of the collar, wherein the stop means comprise a plurality of angularly spaced projections or channels on one of the base and collar, and at least one mating channel or projection respectively on the other of the base and collar, the mating channel or projection being able to slidably engage any selected one of the angularly spaced projections or channels by sliding the collar onto the base, the angularly spaced projections or channels having different lengths to define different degrees of overlap between the collar and the base.

2. A measuring device according to claim 1 in which said collar is adapted to form a seal about said peripheral wall when said collar is mounted to said base.

3. A measuring device according to claim 1 in which said angularly spaced projections are formed on said collar, wherein said angularly spaced projections comprise sections of reduced thickness relative to adjacent sections of said collar.

4. A measuring device according to claim 3 in which said channel is dimensioned to receive said reduced thickness section such that said sections of the walls of the collar portion adjacent said reduced thickness section abut a shoulder formed on said base portion adjacent said channel.

5. A measuring device according to claim 1 in which said angularly spaced projections are substantially parallel to one another.

6. A measuring device according to claim 1 in which said angularly spaced channels are formed on said peripheral wall of said base, wherein at least one raised projection is formed on said collar, and wherein said angularly spaced channels are arranged to selectively receive said at least one raised projection.

7. A measuring device according to claim 1 in which at least one coupling projection is formed on at least one of said plurality of angularly spaced projections or channels, wherein at least one coupling notch is defined on at least one of said mating channels or projections, wherein said coupling projection is operable to releasably couple with said coupling notch to secure said base to said collar.

8. A measuring device according to claim 1 in which the edges of the base portion or the collar are rolled edges.

9. A measuring device according to claim 1 comprising at least one vent to allow gases to exit said measuring device during filling of said measuring device.

10. A measuring device according to claim 9 in which said at least one vent is dimensioned to prevent particulate matter from passing through the vent.

* * * * *